United States Patent [19]

Johnson

[11] 4,302,006
[45] Nov. 24, 1981

[54] RECREATIONAL DEVICE

[76] Inventor: Robert N. Johnson, 4 Gilchrist Rd., Townsend, Mass. 01469

[21] Appl. No.: 169,045

[22] Filed: Jul. 15, 1980

[51] Int. Cl.³ .............................................. A63B 19/02
[52] U.S. Cl. ..................................... 272/115; 280/206
[58] Field of Search ..................... 272/1 B, 33 R, 53.2, 272/54–56, 115, 146; 280/1.11 R, 1.175, 1.181, 1.184, 205–207

[56] References Cited

U.S. PATENT DOCUMENTS

| | | | |
|---|---|---|---|
| 422,089 | 2/1890 | Melin | 280/206 X |
| 2,107,766 | 2/1938 | Rose | 280/206 X |
| 2,680,020 | 6/1954 | Dwyer | 272/53.2 |
| 3,212,790 | 10/1965 | Burling | 280/206 |
| 3,260,324 | 7/1966 | Suarez | 280/206 X |
| 3,693,998 | 9/1972 | Cummins | 272/146 X |
| 3,777,835 | 12/1973 | Bourne | 280/207 X |

FOREIGN PATENT DOCUMENTS

| | | | |
|---|---|---|---|
| 5254 | 11/1979 | European Pat. Off. | 272/115 |
| 393680 | 4/1924 | Fed. Rep. of Germany | 280/206 |
| 859583 | 6/1940 | France | 272/115 |

*Primary Examiner*—Richard J. Apley

*Attorney, Agent, or Firm*—Weingarten, Maxham & Schurgin

[57] ABSTRACT

A recreational device which approximates the feel of downhill skiing without either skis or snow is described in which the device includes a rotatable outer tire and an inner ring which is carried by roller bearing means within the tire. The inner ring is provided with a pivotably mounted platform adapted to provide a foot support for an individual, with the platform in one embodiment including a backwardly projecting extension which serves as a stabilizing tail. An individual utilizing the recreational device is provided with a cross bar secured at waist level to the inner ring via a trapeze arrangement. The size of the ring/tire combination is such that its vertically extending height exceeds that of the largest individual to be accommodated when the individual is standing upright, such that the center of gravity of the ring/tire combination is well above the center of gravity of the individual, thereby creating stability and ease of turning. Back and forth oscillatory movement is controlled by virtue of the stabilizing tail and the entire ring/tire structure is made as light as possible so that a minimum amount of effort is required to overcome gyroscopic restorative forces.

9 Claims, 9 Drawing Figures

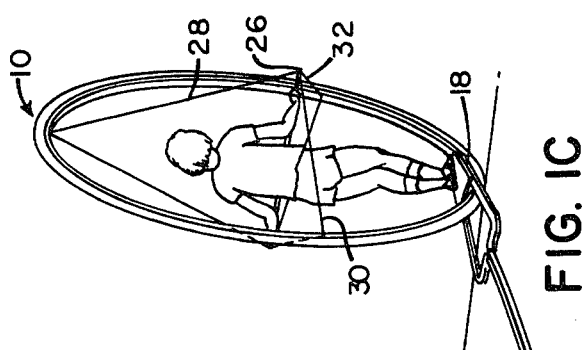
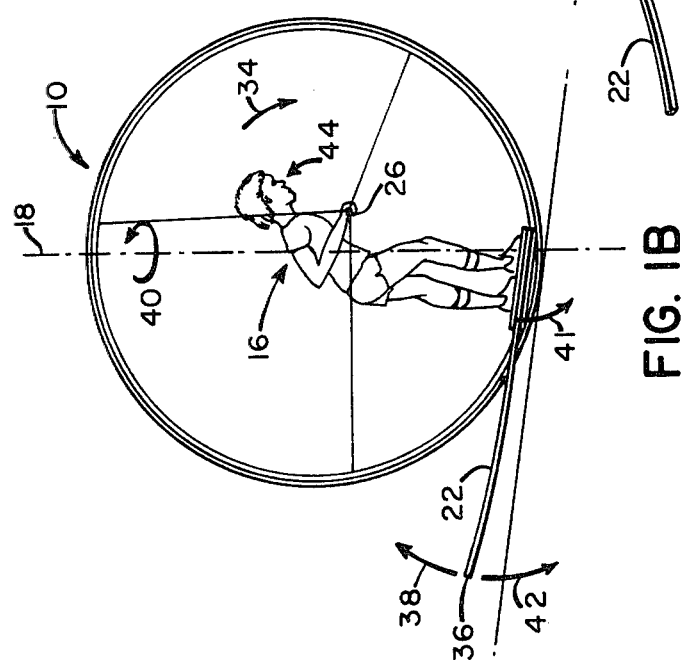
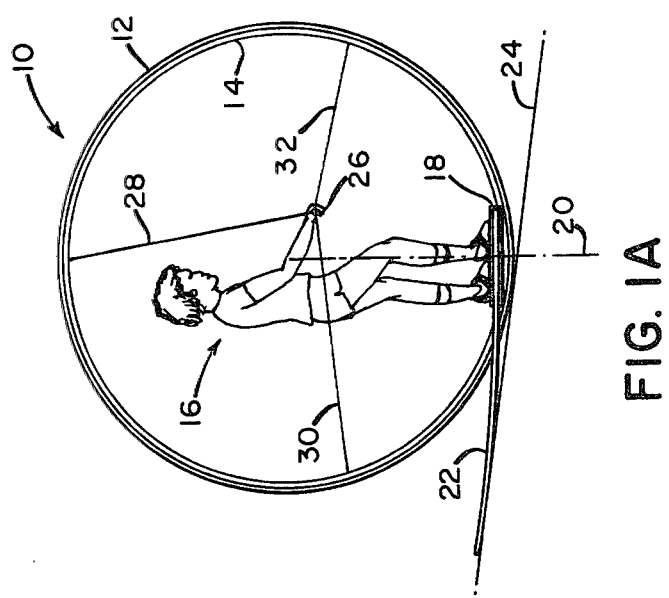

RECREATIONAL DEVICE

FIELD OF INVENTION

This invention relates to a recreational device and more particularly to a device for approximating down hill skiing without benefit of skis or snow.

BACKGROUND OF THE INVENTION

Amusement devices utilizing tires and rings carried internally of the tire have been known in the past and are best exemplified by U.S. Pat. No. 3,575,443 issued to Ralph Aguilar on Apr. 20, 1971. In this device a combination of a ring and a tire is utilized in which an individual is seated on and holds on to an inner ring. It will be appreciated that in the above mentioned patent, the size of the ring is concomitant with the size of an individual in a seated position and that there is no stablizing means shown for preventing back and forth oscillatory movement. Nor is there any means shown in which the individual can readily change the direction of travel of the device. Thus the device is an amusement device in the sense that the individual can exercise very little if any control over the device and in general the individual goes where the device takes him.

Instability of this type of device centers about the fact that the center of gravity of the individual may be above the center of gravity of the structure in which the individual is situated. Moreover, rolling backwards and forwards is not prevented by the amusement device depicted in the aforementioned patent.

Other amusement devices which include either motorized or unmotorized rings or spheres are illustrated in the U.S. Pat. Nos. 3,826,488 issued to Edwin A. Hall, Jr. on July 30, 1974; 3,905,617 issued to Henry Tabb Smith on Sept. 16, 1975; 1,673,774 issued to A. More on June 12, 1928; 1,625,327 issued to A. More on Apr. 19, 1927; 3,260,324 issued to C. R. Suarez on July 12, 1966; 3,622,179 issued to Winifred C. Pfersick on Nov. 23, 1971; 3,420,545 issued to P. E. Dittman on Jan. 7, 1969; 3,338,593 issued to F. W. Gehring on Aug. 29, 1967; 3,746,117 issued to Ray Allred on July 17, 1973; and, 2,953,394 issued to G. E. Anderson on Sept. 20, 1960.

It will be appreciated that in none of the patents is a pivotable platform with a stabilizer extension shown or illustrated. Nor is a structure with an inner and outer ring configured such that the center of gravity of the individual is well below the center of gravity of the combination.

As mentioned before, one of the major problems of all of the prior devices described in the aforementioned patents is stability and the maintaining of the center of gravity of the individual well below the center of gravity of the amusement device.

Moreover, in order to turn or steer such devices a considerable turning moment must be applied by the twisting of the body of the individual utilizing the amusement device.

It will be appreciated that in down hill skiing a twisting moment is imparted to the skis by virtue of an original downward thrust which increases frictional contact with the ground followed by an unweighting of the ends of the skis, followed by a downward thrust. This latter downward thrust is usually to one side or the other in order to change the direction of travel. In the prior art devices cited above there is no ability to establish an initial twisting motion by virtue of any extended frictional contact with the earth such that the turning of these devices whether or not effectuated through momentum exchange is difficult without a base from which to exert the momentum exchange force. Nor is a liftable or unweightable tail or extension shown which would approximate the feel of turning a ski.

SUMMARY OF THE INVENTION

The subject invention is a steerable recreational device which includes large wheel with a rotating outer tire and a stationary inner ring supported by bearings between the inner and outer parts. The inner ring has an articulated platform where a person stands and a trapeze type of cross bar is rigged to the inner ring so that the individual utilizing the device can control turning and balance of the wheel. Attached to the platform is a trailing stabilizer or extension so that the operator will not have a tendency to oscillate within the wheel. Control is maintained rolling down a slope by the operator exerting turning moments on the wheel along a vertical axis. Reaction from the turning moment is taken from the platform/trailing stabilizer extension.

As a feature of the subject invention the diameter of the wheel is considerably larger than the full standing height of the operator so that the center of gravity of the operator is well below the center of gravity of the wheel. The center of gravity of the wheel in the usual instance is the center of the wheel. Moreover, the total mass of the wheel is kept small compared to the weight or mass of the operator so small quick balance turning adjustments can be easily made.

Stopping is accomplished by quickly turning the wheel to go back up the hill until stopped or turning and skidding sideways until stopped. It will be of course appreciated that any braking device operating between the inner ring and the outer wheel or tire would result in rotational upset of the operator and therefore is not used.

It will be appreciated that leaning forward shifts the operator's weight and lifts the trailing stabilizer extension for very sharp turns, not unlike the unweighting of the tail of conventional skis during turns. A considerable moment of inertia of the platform around a vertical axis is also necessary for providing a steering action on the wheel. Balance is accomplished by turning the wheel into the direction of wheel tilt or wheel unbalance. The total mass of the wheel is to be as small as construction technology allows with respect to operator mass. As the mass of the wheel becomes small as compared to operator mass, the steering becomes easier with the operator's body mass being adequate to provide turning moments around a vertical axis for steering requirements. Also the tendency for the operator to oscillate within the wheel becomes less.

DESCRIPTION OF THE DRAWINGS

These and other features of the present invention are more fully set forth below in the detailed description of the preferred embodiment presented below for purposes of illustration, not by way of limitation, and the accompanying drawing of which:

FIGS. 1A–1C illustrate the recreational device in operation on a downhill slope including the resting of the platform extension on the ground, the raising of the extension and the turning of the entire assembly;

DETAILED DESCRIPTION OF THE INVENTION

Figure 2:
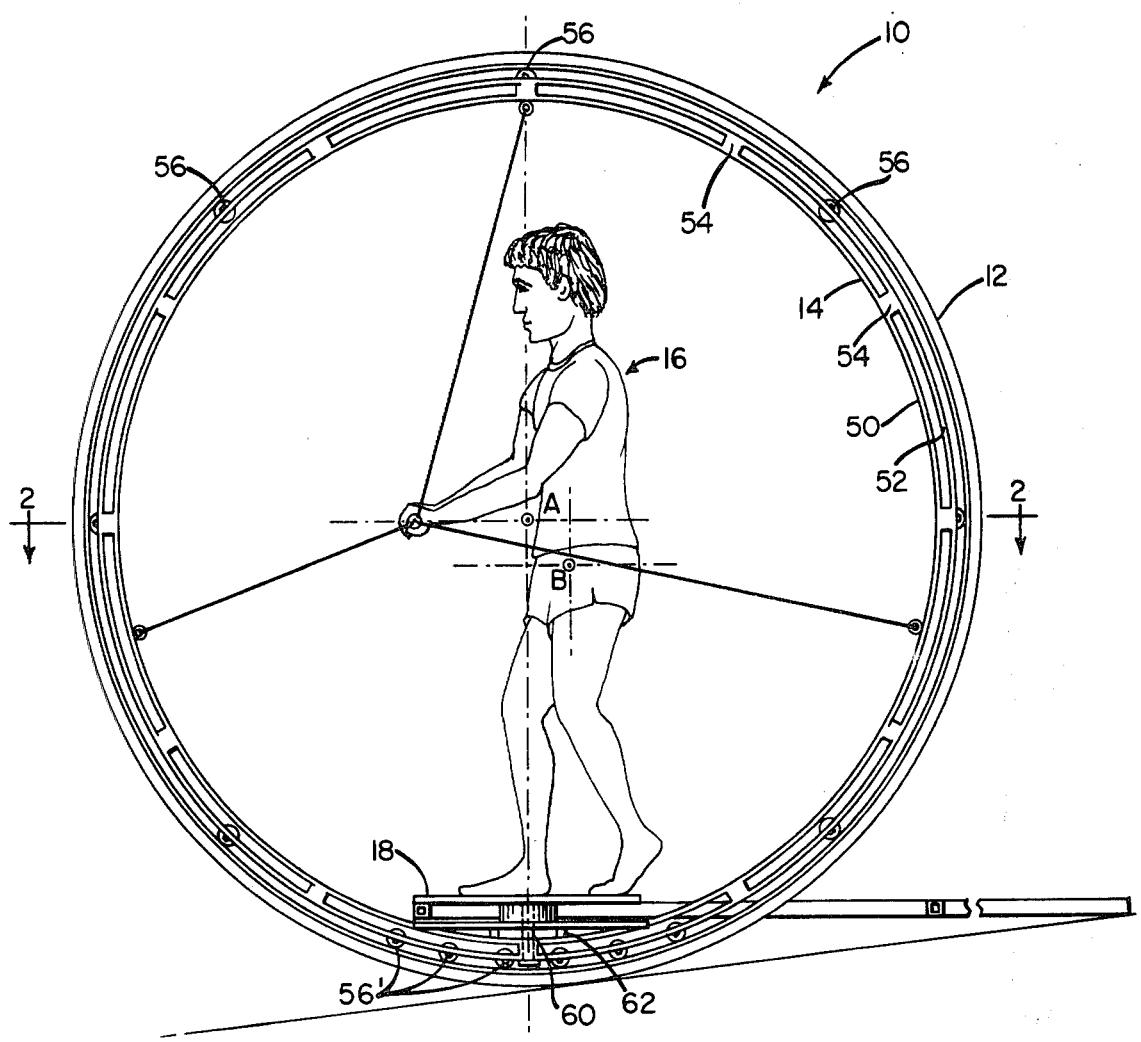
FIG. 2 is a side view of the recreational device, illustrating the center of gravity of the wheel versus the center of gravity of the individual operating the device.

Referring now to FIGS. 1A-1C, the recreational device 10 is illustrated as including an outer ring-shaped tire 12 on which is rotationally supported an inner ring 14. An individual 16 is illustrated as standing on a platform 18 which is pivotaly mounted to ring 14 such that the platform may move in a limited horizontal direction about a vertical axis 20. The platform includes an extension 22 which serves a stabilizer tail which, as illustrated in FIG. 1A, rests on slope 24.

The individual is illustrated as grasping a crossbar 26 which is slung from the inner ring 14 in a trapeze-like structure including cables 28, 30 and 32. The trapeze mounting system exerts force at diametrically opposite points on the inner ring so the ring can be turned without bending it out of shape. Were a single point rigid system be used to mount the crossbar to the inner ring, the ring would have to be more rigid and thus heavier. The use of the trapeze type mounting system thus permits the use of a lighter inner ring.

In operation, the individual is supported within the trapeze structure as the wheel moves down slope 24 with the inner ring maintained stationary by the individual and the extension.

As illustrated in FIG. 1B, in order to execute a turn, the individual 16 leans forward so as to displace his body as illustrated by arrow 34 in a forward direction. The causes the end or tip 36 of extension 22 to rise in the direction illustrated by arrow 38. The sensation is similar to the unweighting of conventional skis. Thereafter with a torque around vertical axis 18 as illustrated by arrow 40, the aft end of the platform moves in the direction of arrow 41 and the individual swings extension end 36 in the direction of arrow 42 also applying pressure on the crossbar in the direction of arrow 44. This provides that the aft end of the platform and the stabilizer extension move in the same direction which forces the recreational device counter-clockwise about the vertical axis such that the device changes direction as illustrated in FIG. 1C. Extension 22 is thence returned to the same plane as the wheel-like structure, such that during normal downhill running or travel the extension lies in the same plane as the wheel.

It will be appreciated that the unweighting of extension 22 and the movement of it in the direction of arrow 42 provides a lever arm and mass which is rotated about the vertical axis so that pressure can be exerted on crossbar 26 to effectuate turning the recreational device about the vertical axis. Slight turns in the direction of travel may be accomplished merely by leaning towards the direction that the wheel is intended to go in much the same way that slight turns are effectuated during skiing.

A more detailed side view of the recreational device is illustrated in FIG. 2 in which like parts carry like reference characters with respect to FIG. 1. In FIG. 2 it can be seen that inner ring 14 is composed of two rings 50 and 52, secured to each other via spacers 54 so as to provide an box beam cross-section. This construction is lightweight yet rigid enough to support individual 16 within the apparatus. Bearings 56 are located about ring 14 so as to provide very low friction movement between ring 14 and tire 12. Additional support bearings 56' may be provided at the base of the recreational device for load bearing purposes.

As can be seen in this figure, platform 18 is pivotally mounted to ring 14 via bolt and sleeve structure 60 illustrated in phantom. Platform 18 rests in sliding contact on mounting base 62 which supports the platform directly under individual 16.

The center of the wheel is illustrated by point A which for all practical purposes represents the center of gravity of the recreational device. This point will of course be adjusted downwardly with respect to the weight represented by the platform and platform attaching structure. As also illustrated, the center of gravity of the individual is at point B which is displaced below the center of gravity of the recreational device. This is important to the stability of the device and permits a type of control not realizeable if the center of gravity of the individual coincides with the center of gravity of the rotational device or in fact is above it.

Figure 3:
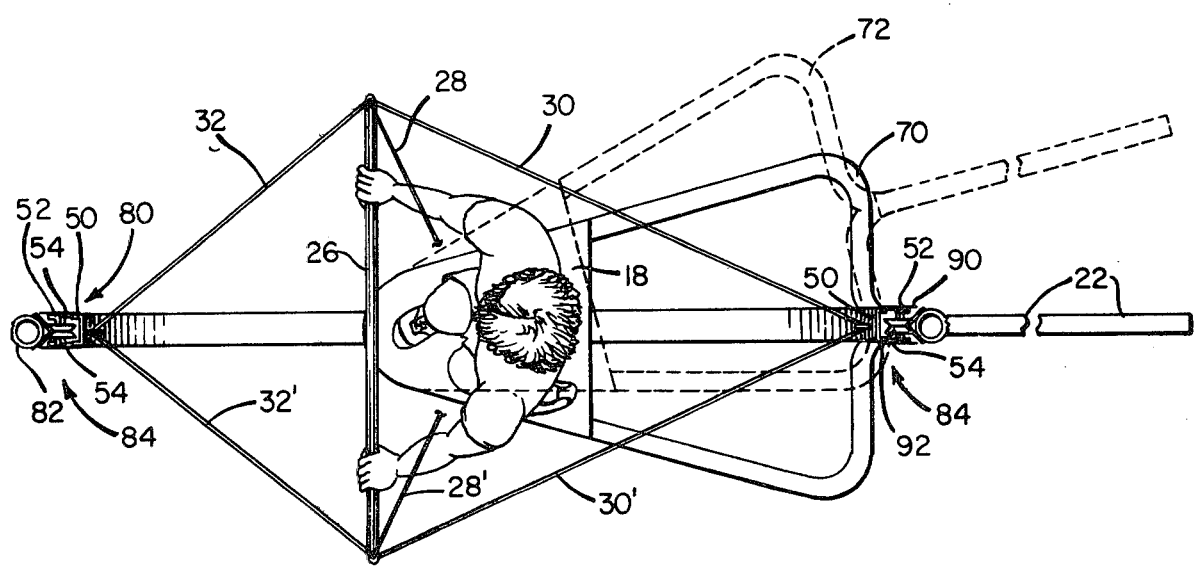
FIG. 3 is a top view of the recreational device cut away just above the head of the individual utilizing the device.

Referring to FIG. 3, it can be seen that crossbar 26 is supported via the trapeze structure, with cables 28, 30 and 32 as illustrated for one side support of the crossbar. The other end of the crossbar is supported by cables 28', 30' and 32'.

In this figure, it can be seen that platform 18 is supported on a triangularly shaped frame 70 with extension 22 being integrally formed as an extension to the the base of the triangle. The movement of platform 18 in the horizontal direction is shown by dotted line 72.

Also illustrated in FIG. 3 is the inner ring structure here illustrated at 80 with the tire structure being shown to be of a resiliant material 82. The bearing structure illustrated at 84 is more fully described in connection with FIG. 4.

Figure 4:
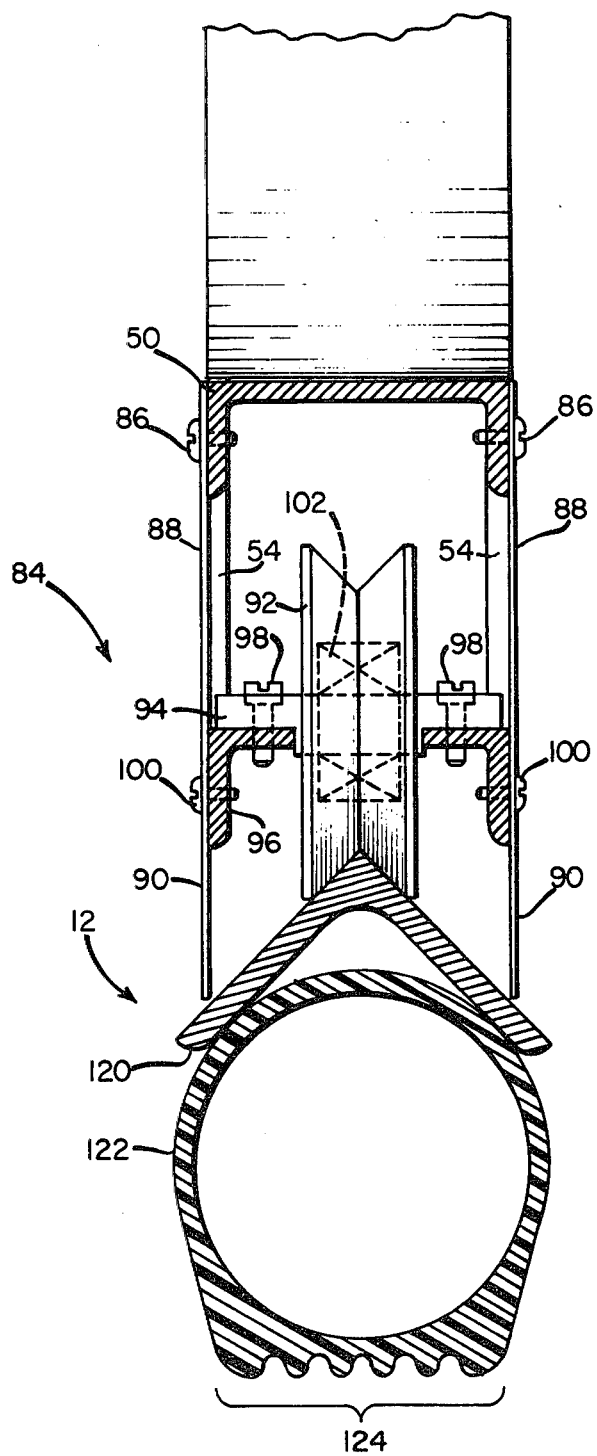
FIG. 4 is a cross-sectional view of one type of bearing utilized between the inner ring and outer tire of the recreational device; and, FIGS. 5A-5C illustrate an alternative embodiment involving a separately pivoted stabilizer used to allow a smaller turning radius by magnifying the effect of platform twist.

Referring now to FIG. 4, one type bearing assembly which is designed to prevent grass and debris from fouling the bearing assembly in general is mounted on ring 50. Attached to ring 50 via bolts 86 is a cage assembly 88 having extended skirt portions 90. Carried intermediate assembly 88 is a bearing wheel 92 mounted for rotation about a bearing axel 94 which is secured to a bracket 96 via bolts 98. Bracket 96 is secured to assembly 88 via bolts 100.

A bearing 102 is mounted about axel 94 and bearing wheel 92 is rotatably mounted to the axel via this bearing. In cross-section the bearing wheel has a spool-like shape which in one embodiment has a V-shaped cross-section.

The outer wheel 12, in the embodiment illustrated in FIG. 4 includes an annular member 120 which has an inverted V-shaped cross-section with the apex of the V being accommodated within the V-shaped cross-section of the bearing wheel. At the open end of the V-shaped cross-sectioned annular member 120 is located a tubular or like configured tire 122 which resides within the V of the annular member.

It will be appreciated that annular member 120 is free to rotate with respect to inner ring 50 by virtue of the bearing structure described, with grass and other debris being kept out of the bearing structure by virtue of the skirt extensions 90.

In one embodiment tire 122 is provided with longitudinally running heavy grooves to achieve maximum gripping to the ground so as to resist lateral forces encountered in steep banking forms.

Figure 5A:
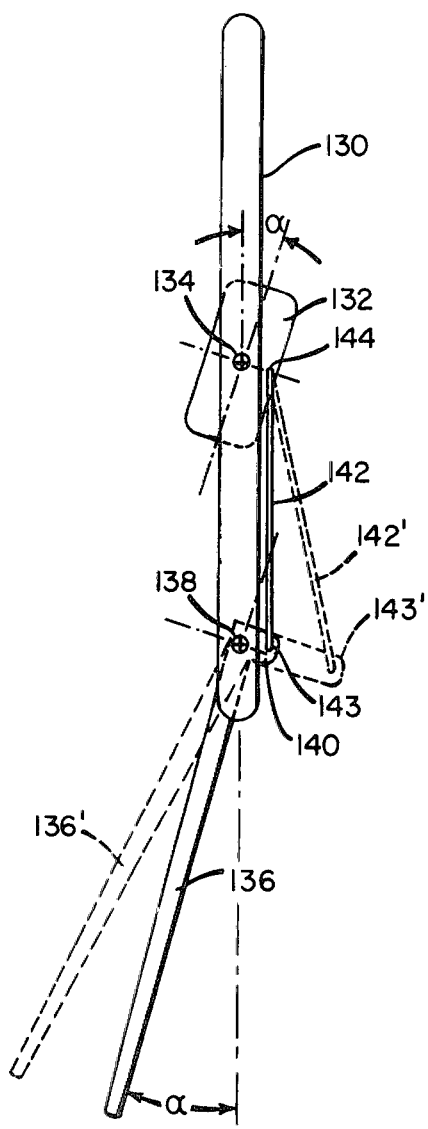
Figure 5B:
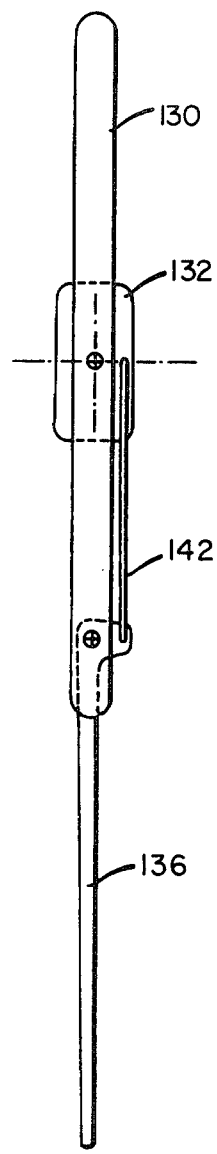
Figure 5C:
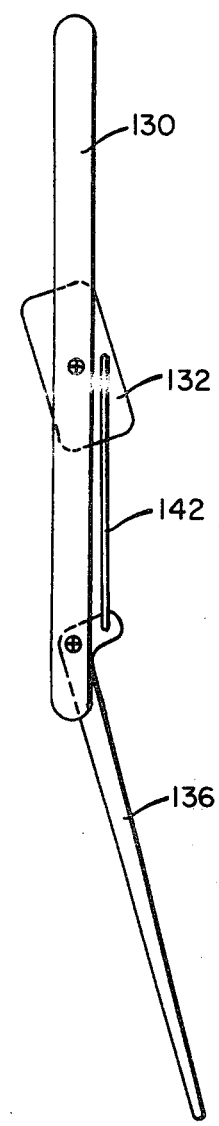

Referring now to FIGS. 5A, 5B and 5C, an embodiment is illustrated in which the movement of the platform can be augmented so that the stabilizer is swung through a greater angle than that represented by the angular displacement of the platform. This permits a smaller turning radius. In FIG. 5A, the recreational device is illustrated in top view and schematically by wheel 130. Situated on wheel 130 is pivoted platform 132 which is pivoted about point 134. The device carries a pivotally mounted stabilizer 136 which is pivoted from an extension of the inner ring (not shown) which extends aft of the wheel. The pivot point is illustrated by point 138.

Stabilizer 36 is provided with an extension 140 which serves as a lever arm and a linkage rod 142 extends from a point 143 at the outer portion of the lever arm to a laterally off center point 144 on platform 132.

When the platform 132 is swung through the angle here illustrated by $\alpha$, it is possible that the stabilizer can be swung through this same angle $\alpha$ if the distance between pivot point 134 and point 144 is the same as the between pivot point 138 and point 143. Alternatively, if the distance betwen pivot point 138 and point 143 is increased, the angular displacement of the stabilizer for a given angular displacement of the platform will increase proportionally. This is shown by dotted stabilizer 136' dotted linkage 142', and point 143'.

Referring to FIG. 5B, the straight running position is illustrated and referring to FIG. 5C, turning in the opposite direction is illustrated.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A recreational device comprising:
    an outer ring shaped member;
    an inner ring mounted for rotation within said outer ring;
    a platform adapted to support an individual within said inner ring, said platform being pivotally mounted to said inner ring;
    a stabilizer adapted to rest in one position on the ground and extend aft of said inner and outer rings, said stabilizer coupled to said platform such that said stabilizer moves in the same direction as the aft portion of said platform; and,
    means secured to said inner ring and adapted to be grasped by said individual for enabling said individual to apply a torque to said inner ring.

2. The device of claim 1 wherein said inner ring includes a tire at the outside thereof said tire having longitudinally running grooves.

3. The device of claim 1 wherein said torque applying means includes a trapeze like structure having a bar and wire to attach said bar to said inner ring.

4. The device of claim 1 and further including shield means attached to said inner ring and extending to the sides of said outer ring to prevent material from penetrating between said inner and outer rings.

5. The device of claim 1 wherein the diameter of said rings is enough greater than the standing height of an individual to be accomodated therewithin so that the center of gravity of said individual is below the center of gravity of said device.

6. The device of claim 1 wherein the pivot point of said stabilizer coincides with the pivot point of said platform.

7. The device of claim 1 wherein the pivot point of said stabilizer is aft of the pivot point of said platform, wherein said stabilizer includes a lever arm at right angles thereto, and wherein the coupling of said stabilizer to said platform includes a linkage between said lever arm and a laterally off center portion of said platform.

8. The device of claim 7 wherein the length of said lever arm is such that the angular displacement of said stabilizer matches the angular displacement of said platform.

9. The device of claim 7 wherein the length of said lever is such that the angle of displacement of said stabilizer exceeds the angle of displacement of said platform.

* * * * *